F. A. PERRY.

Spark Arrester.

No. 9,364. Reissued Aug. 31, 1880.

WITNESSES.

S. N. Berney

G. E. Dutton

INVENTOR.

Francis A. Perry per Alfred Berney attorney

N. PETERS, PHOTO-LITHOGRAPHER, WASHINGTON, D. C.

UNITED STATES PATENT OFFICE.

FRANCIS A. PERRY, OF KEENE, NEW HAMPSHIRE.

SPARK-ARRESTER.

SPECIFICATION forming part of Reissued Letters Patent No. 9,364, dated August 31, 1880.

Original No. 153,907, dated August 11, 1874. Application for reissue filed March 26, 1880.

DIVISION B.

*To all whom it may concern:*

Be it known that I, FRANCIS A. PERRY, of Keene, in the county of Cheshire and State of New Hampshire, have invented certain new and useful Improvements in Spark-Consumers; and I do hereby declare that the following is a specification, reference being had to the accompanying drawings, making part of it.

The invention relates to spark arresters and consumers in locomotives and portable boilers. Heretofore they have been expensive, clumsy, homely, and many of them inoperative.

This invention is neat, cheap, effective, and easily adapted to nearly all of the coal or wood burning stacks, or to new ones.

My invention consists in placing within the stack and smoke-arch of engines used on railroads and other places the following devices for arresting and returning sparks, dust, and other unconsumed and combustible matter through one or more flues (used previously for generating steam) to the fire-box, to be there burned—viz., a box secured to the flue, provided with a sliding shutter or door placed in the front or bottom of said box, to cover one or more flues; a pipe connecting said box with the stack or saddle opening into the spark-receiving chamber formed by the outer and inner stacks; a deflecting-cone, rifled or smooth.

Figure 1:
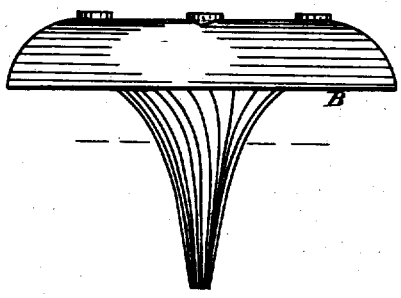
Figure 2:
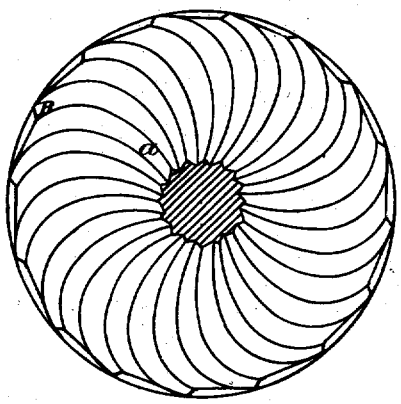
Figure 3:
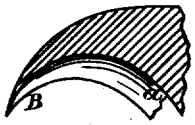

In the accompanying drawings, in which similar letters of reference indicate like parts, Figure 1 represents a sectional side view of a locomotive steam-boiler and smoke-stack. Fig. 2 represents a sectional view of the front end of a boiler, (open end.)

In the smoke-arch C of the boiler A, fasten over one or more boiler-tubes, convenient to clear other parts of the engine, a box, D, which is made of metal, open at the rear next to the flues, with an opening at the top to receive a pipe about four inches in diameter. The box in the drawings is closed at the bottom, a front having holes to correspond with the size and number of flues. These holes are covered at will with a slide similar to a register in use in stoves. A door can be used at the front or bottom of the box and worked from the cab with a rod and elbow. The box can be bolted onto the flue-sheet or by other suitable means. Into the top of the box insert an iron pipe, I. The other end of this pipe has a flange to bolt on the inside of the stack F, as shown. It can be connected with the saddle, and an opening can be cast or drilled.

The cone N is a spiral fluted or rifled cone from the point to near the outer edge. This style of cone will send the sparks in a whirling motion to the spark-chamber I; but I do not limit myself to this style of cone, as others can be used with my devices, but I prefer the rifled cone, as I am satisfied that it sends the sparks into the chamber with more certainty and volume than any other kind and in a better condition for combustion.

The operation of an apparatus involving my invention, constructed and arranged as shown, would be as follows: When the engine is at rest the smoke and gases would pass through the flues from the furnace up through the smoke-box or arch, the stack and netting into the air, and would pass through the spark-returning tubes if the slide were open. When the engine is put in motion and the exhaust blast or steam is forced through the top *g g*, up the petticoat-pipe P and smoke-arch C, the stack, and netting S, it causes a vacuum in the smoke-arch, which draws the smoke and sparks from the fire-box B through the flues R R, thence forced upward through the petticoat and arch and inner pipe or stack, F, against the cone. The solid and a portion of the gaseous products are sent down into the chamber I I, thence driven down or drawn into the pipe J, thence into the box D and flues K K, falling into the fire-box B red-hot. The results are that steam is generated with much less fuel, the locomotive running cleaner and free from sparks that set fire to the woods, fields of grain, houses, barns, depots, bridges, and any combustible products or property along the line of railroad where the locomotives run.

The flange H on top of the inside cylinder of the chamber I I keeps sparks from being drawn out by any currents of air or steam.

The box D is located over the top row of flues; but I do not confine myself to that row, as it is only placed there for convenience, and I prefer it there, as the box D and pipe J are kept very hot and will superheat steam and products of combustion very hot, so that they can be readily united with the flames in the furnace, and thereby save fuel. The sliding lid *d* is to be used to allow any condensed steam or water to run out. It will be useful to use when any dirt may be lodged in it, and while running backward it may be kept open.

The plates L L may be used or not. The standards O O hold the cone and are used in the usual manner. Most of the stacks now in use can be easily adapted for this purpose.

I am aware that sparks, smoke, and gas have been conducted to and conveyed through pipes and flues connected to the smoke-stack on the outside of the boiler and the furnace by means of fans, blowers, &c., and that flues and pipes have been connected with the spark-chamber around the stack, thence down the smoke-arch to a large chamber covering the bottom of the smoke-arch. Said device does not act like mine, as the chamber fills up with sparks and remains so, and no sparks can go through. If the engine were run over, it would fill with water.

I do not claim a pipe or pipes from the stack connected with air-pipes open to the front, as they clog up. Neither do I claim a chamber or connection with enlarged pipes with air-pipes.

I am aware that a furnace return-flue, smoke-stack, bell-mouth cone, petticoat-pipe, and exhaust-blast have been used by David Mathew and others since 1856, by which the sparks and smoke were forced by the blast from the exhaust, called a "compound blast" by one party who claims it. I know that all such contrivances have been abandoned and discarded inevery case for years past. I am not aware, however, of any invention like mine.

I therefore claim as new and desire to secure by Letters Patent—

1. The combination of the furnace B, boiler flues or tubes K K, box D, placed over one or more tubes, pipe J, chamber I I, with collar H, all arranged substantially as described.

2. The combination of the cone N, standards O O, chamber I I, pipe J, box D, with slides *d*, flues K, and furnace B, all arranged substantially as described.

3. The spark-box D, arranged within the smoke-arch, with or without the slide, substantially as and for the purpose set forth.

4. The combination of the spark-box D with the shutter *d* and flues or tubes R, to be used for generating steam when desired, substantially as described.

5. The combination of a spark-chamber with pipes and box with one or more boiler-flues, for the purpose of returning sparks to the fire-box, all arranged as shown and specified.

6. The combination of the boiler A, furnace B, flues R, smoke-arch C, tops *g g*, petticoat P, pipe F, standards O O, lip H, cone N, netting S, chamber I I, spark-pipe J, box D, shutter *d*, tubes K K, for returning the sparks to the fire-box to be consumed, as described.

FRANCIS A. PERRY.

Witnesses:

EDWARD JOSLIN,
GEO. A. LITCHFIELD.